United States Patent

Yeh et al.

[11] Patent Number: 5,938,862
[45] Date of Patent: Aug. 17, 1999

[54] FATIGUE-RESISTANT LEAD-FREE ALLOY

[75] Inventors: Shing Yeh; Curtis Wayne Melcher; Bradley Howard Carter, all of Kokomo, Ind.

[73] Assignee: Delco Electronics Corporation

[21] Appl. No.: 09/070,070

[22] Filed: Apr. 3, 1998

[51] Int. Cl.$^6$ ............................. C22C 7/00; C22C 13/00
[52] U.S. Cl. .................... 148/400; 420/560; 228/56.3
[58] Field of Search ................................. 420/557, 560; 148/400; 228/56.3

[56] References Cited

U.S. PATENT DOCUMENTS

| | | | |
|---|---|---|---|
| 5,328,660 | 7/1994 | Gonya et al. | 420/562 |
| 5,344,607 | 9/1994 | Gonya et al. | 420/562 |
| 5,352,407 | 10/1994 | Seelig et al. | 420/561 |
| 5,368,814 | 11/1994 | Gonya et al. | 420/587 |
| 5,393,489 | 2/1995 | Gonya et al. | 420/561 |
| 5,405,577 | 4/1995 | Seelig et al. | 420/561 |
| 5,427,865 | 6/1995 | Mullen, III et al. | 428/559 |
| 5,435,968 | 7/1995 | Panthofer | 420/561 |
| 5,520,752 | 5/1996 | Lucey, Jr. et al. | 148/400 |
| 5,527,628 | 6/1996 | Anderson et al. | 428/647 |

FOREIGN PATENT DOCUMENTS

| | | |
|---|---|---|
| 622151 | 11/1994 | European Pat. Off. . |
| 3641679 | 8/1987 | Germany . |
| 4002739 | 1/1992 | Japan . |
| 97/09455 | 3/1997 | WIPO . |

*Primary Examiner*—Sikyin Ip
*Attorney, Agent, or Firm*—Jimmy L. Funke

[57] ABSTRACT

A lead-free solder alloy suitable for forming solder joints of a surface-mount integrated circuit device, such as a flip chip. The solder alloy has a sufficiently low liquidus temperature to achieve desirable reflow properties at temperatures of 240° C. and less, and is therefore compatible with integrated circuit processes. The solder alloy has a sufficiently high solidus temperature to ensure that solder joints formed with the alloy exhibit suitable mechanical properties at application temperatures up to 150° C. when mounting a component to a laminate substrate. The solder alloy generally contains, in weight percent, about 7 to about 11% indium, about 2.5 to about 3.5% silver, and about 0.5 to about 1.5% copper, the balance tin and incidental impurities.

11 Claims, No Drawings

5,938,862

FATIGUE-RESISTANT LEAD-FREE ALLOY

FIELD OF THE INVENTION

The present invention generally relates to a lead-free solder composition of the type used with electronic packaging, such as flip chip packaging. More particularly, this invention relates to a solder alloy having a reflow temperature characteristic that is compatible with typical surface-mount assembly processes using a 63Sn-37Pb reflow profile and laminate substrates, yet is suitable for use in applications with a maximum IC junction temperature of 150° C. In addition, the alloy exhibits improved thermal fatigue resistance as compared to the 63Sn-37Pb flip chip bump alloy.

BACKGROUND OF THE INVENTION

Electronic circuit assemblies are often required to be capable of surviving in hostile operating environments, including those commonly found in automotive and aerospace applications. Such assemblies often employ surface-mount (SM) integrated circuit (IC) devices, which are generally characterized as being electrically and mechanically attached to the substrate of an electronic circuit assembly with a number of terminals or leads that are soldered to conductors on the surface of the substrate, which may be a ceramic substrate, laminate board, flex circuit, or a silicon substrate. A prominent example of a SM IC is a flip chip, which has bead-like terminals typically in the form of solder bumps on a surface of the chip. The solder bumps of a flip chip are generally formed by selectively depositing a solder composition, such as a solder paste containing a solder alloy and binder, on the flip chip, and then reflowing the solder material by heating the material above its liquidus temperature so that the molten material coalesces to form the solder bumps on the surface of the chip. After solidifying, the solder bumps can be precisely registered with their corresponding conductors on a substrate, and then reheated above the solder material's liquidus temperature in order to both bond the chip to the substrate and electrically interconnect the flip chip circuit to the conductor pattern. The temperature at which the solder is reflowed to form the solder bump and later reflowed to mount the flip chip is referred to as the reflow temperature.

There is a desire in the electronics industry to limit the use of lead-containing materials due to environmental concerns. In addition, there are serious reliability concerns for some flip chip devices due to the alpha particles emitted by lead-containing bump alloys. Lead-containing alloys usually contain a certain amount of lead isotopes, such as Pb-210 or Pb-214. These isotopes are very difficult to remove during typical lead metal refining processes unless extremely expensive laser plasma isotope separation processes are used. These isotopes are chemically unstable, and will emit alpha particles during the normal radioactive decay process. Alpha particles released through radioactive decay of Pb-210 and Pb-214 can carry an energy of up to 5.4 MeV and 7.8 MeV, respectively. A S MeV alpha particle could penetrate up to 25 micrometers of silicon and generate 1.4 million electron-hole pairs. If the electron-hole accumulation exceeds the critical charge for a circuit such as a cell in a DRAM, a soft error could occur in the memory section of the device. High purity Pb-free alloys usually do not contain heavy elements and are therefore free of radioactive isotopes.

There are many commercially available Pb-free alloys, including Sn-52In, Bi-42Sn, Sn-20In-2.8Ag, Sn-3Ag-2Bi, Sn-5Ag, Sn-8.5Sb, Sn-1Cu, Sn-3.5Ag, Sn-2.5Ag-0.8Cu-0.5Sb, Sn-4.8Bi-3.4Ag, Sn-9Zn and Sn-8.8In-7.6Zn. However, none of these alloys meet the requirements for automotive applications with flip chips on laminate boards. Many of the alloys contain bismuth. Though bismuth is environmentally friendly, it also contains radioactive isotopes that are difficult to remove. Consequently, bismuth-containing alloys are not typically suitable for flip chip packaging applications due to the potential for alpha-particle induced reliability concerns.

A typical requirement for automotive applications is to withstand 150° C. junction temperatures for an extended period of time (e.g., 2000 hours continuous operation at 150° C.). This requirement excludes all Pb-free alloys with solidus temperatures under about 170° C., such as Sn-52In, Bi-42Sn and Sn-20In- 2.8Ag. Though the reported solidus temperature of the Sn-20In-2.8Ag alloy is about 175° C., this alloy has been unable to pass a −50° C./+150° C. thermal cycle test due to the presence of a eutectic In/Sn phase having a melting temperature of about 120° C. Accordingly, 120° C. is the effective solidus temperature of this alloy.

For cost saving purposes, there is a trend to mount flip chips directly on laminate boards along with other SM components using a typical eutectic component reflow process with peak reflow temperatures of about 225° C. to about 240° C. In this case, flip chips are treated as another standard SM component, and are attached to the substrate with one eutectic Sn/Pb component reflow. This requires an alloy with a liquidus temperature of about 200° C. or lower, and excludes the remaining Pb-free alloys noted above except for Sn-9Zn and Sn-8.8In-7.6Zn. Solder pastes formed with these last two alloys are very difficult to process due to a well-known susceptibility to zinc oxidation. This oxidation problem can be problematic and cause poor bumping and substrate assembly yields.

Accordingly, it would be desirable if a lead-free solder composition were available that was capable of forming solder joints that can reliably withstand applications with maximum IC junction temperatures of 150° C., yet can be assembled to laminate boards with other SM components at a peak reflow temperature of less than 240° C.

SUMMARY OF THE INVENTION

According to the present invention, there is provided a lead-free solder alloy suitable for forming solder joints of a surface-mount (SM) integrated circuit (IC) device, such as a flip chip. The solder alloy has a sufficiently low liquidus temperature to achieve desirable reflow properties at temperatures of 240° C. and less, and is therefore compatible with typical laminate circuit board assembly processes. The solder alloy has a sufficiently high solidus temperature to ensure that solder joints formed by the alloy exhibit suitable mechanical properties at application temperatures up to 150° C. when mounting a component to a laminate substrate.

Generally, the solder alloy of this invention is a lead-free tin-base alloy containing, in weight percent, about 7 to about 11% indium, about 2.5 to about 3.5% silver, and about 0.5 to about 1.5% copper, the balance preferably being tin and incidental impurities. The alloy having the above composition is characterized by solidus and liquidus temperatures of less than 200° C., while exhibiting suitable mechanical properties at application temperatures of up to 150° C. As such, the solder alloy can be reflowed at sufficiently low temperatures so as not to thermally damage other components on a laminate board to which the flip chip is mounted, yet results in the formation of solder joints that exhibit enhanced reliability in severe thermal environments.

Other objects and advantages of this invention will be better appreciated from the following detailed description.

DETAILED DESCRIPTION OF THE INVENTION

The solder alloy of this invention is generally of the type intended to be deposited in the form of a solder paste onto a surface-mount (SM) integrated circuit (IC) device, such as a flip chip, for the purpose of forming solder bumps in a manner known in the art. In accordance with this invention, the solder alloy has solidus and liquidus temperatures of less than 200° C., enabling the alloy to be reflowed at temperatures that will not damage other components on the same substrate as the flip chip, yet the alloy yields solder joints that exhibit suitable mechanical properties to survive at application temperatures of up to 150° C.

The solder alloy of this invention is generally based on the eutectic Sn-3.5Ag solder alloy, having a melting temperature of about 221° C. The base alloy is modified to yield a noneutectic alloy having solidus and liquidus temperatures lower than the melting temperature of the base alloy. According to the invention, about 7 to about 11 weight percent indium is preferably added to the base alloy for this purpose, resulting in the modified alloy having a liquidus temperature of about 200° C. However, in doing so the alloy exhibits an indium-tin eutectic that melts at about 120° C. The present invention depresses the formation of the In-Sn eutectic with limited additions of copper, the presence of which also reduces the liquidus temperature of the alloy to less than 200° C. As an example, the In-Sn eutectic is substantially eliminated with a solder alloy composition containing, in weight percent, about 89.1% of the Sn-3.5Ag alloy (i.e., the solder alloy contains about 86% tin and about 3.1% silver), about 9.9% indium, and about 1% copper. The liquidus temperature of this solder alloy is about 197° C.

According to this invention, solder alloys exhibiting the desirable properties of this invention contain, in weight percent, about 7 to about 11% indium, about 2.5 to about 3.5% silver, and about 0.5 to about 1.5% copper, with the balance preferably being essentially tin (e.g., about 84 to about 90 weight percent tin) and incidental impurities. Such alloys have a solidus temperature of about 189° C. and a liquidus temperature of about 197° C. More preferred levels for silver and copper are about 3 to 3.5 weight percent silver and 0.9 to 1.1 weight percent copper. A preferred nominal composition for the solder alloy of this invention is, in weight percent, 85.8% tin, 10% indium, 3.2% silver, and 1% copper.

From the above, it can be seen that solder pastes containing a suitable binder and the solder alloy of this invention can be reflowed to form solder bumps on a surface-mount device, such as a flip chip, at reflow temperatures of about 230° C. to about 240° C., which is compatible with laminate board assembly processes with 63Sn-37Pb component solder joints. As known in the art, a second reflow operation metallurgically bonds the solder bumps to their corresponding conductors on a circuit substrate, forming solder joints that advantageously exhibit desirable mechanical strength at temperatures of up to 150° C., including resistance to thermal cycle fatigue. As a result, the solder alloy of this invention enables a flip chip to be reliably mounted to a substrate that is subject to severe thermal environments.

During an evaluation of the present invention, four solder alloys having the compositions indicated below were evaluated.

Alloy A 87.8Sn-8.0In-3.2Ag-1.0Cu
Alloy B 87.3Sn-8.0In-3.2Ag-1.0Cu-0.5Sb
Alloy C 85.8Sn-10.0In-3.2Ag-1.0Cu
Alloy D 85.3Sn-10.0In-3.2Ag-1.0Cu-0.5Sb For each of these compositions, solder bumps of 18 mil pitch (about 0.46 millimeters) were formed on 0.250×0.250 inch (about 6.35×6.35 millimeters) and 0.500×0.500 inch (about 12.7.12.7 millimeters) test chips. Using a 63Sn-37Pb reflow profile having a 230° C. peak temperature, the smaller chips were assembled without underfill to ceramic substrates while the larger chips were assembled with underfill to laminate boards.

The smaller chips were then reliability tested by thermal cycling between −50° C. and +150° C. to determine the relative thermal fatigue life (RTFL) of the bump alloys. For comparison, identical chips were bonded to identical ceramic substrates using the 63Sn-37Pb alloy and the commercially-available lead-free alloys Sn-3.5Ag, Sn-2.5Ag-0.8Cu-0.5Sb, Sn-5Sb, Sn-8.5Sb and Sn-20In-2.8Ag. The RTFL of all chips with lead-free solder bumps are indicated below in comparison to the average fatigue life of the 63Sn-37Pb specimens, with the latter being assigned a baseline value of 1.0.

| | |
|---|---|
| Alloy A | 1.1 |
| Alloy B | 0.8 |
| Alloy C | 1.5 |
| Alloy D | 1.3 |
| 63Sn—37Pb | 1.0 |
| Sn—3.5Ag | 0.5 |
| Sn—2.5Ag—0.8Cu—0.5Sb | 0.8 |
| Sn—5Sb | 0.4 |
| Sn—8.5Sb | 0.5 |
| Sn—20In—2.8Ag | 0.3 |

From the above, it can be seen that Alloys A and C, formulated in accordance with the present invention, outperformed all of the commercially available lead-free alloys as well as the industry-standard 63Sn-37Pb alloy. Alloys B and D did not perform as well as Alloys A and C, respectively, on whose compositions Alloys B and D, respectively, were based but with the addition of 0.5 weight percent antimony. From this, it was concluded that antimony was detrimental to the fatigue life of solder alloys formulated in accordance with this invention. However, Alloys B and D did perform at least as well as the lead-free alloys, and Alloy D outperformed the lead-free and 63Sn-37Pn alloys.

Forty of each of the 0.500×0.500 chips mounted to laminate substrates with Alloys A and C were then evaluated by thermal cycling between −40° C. and +125° C. Reliability of the bump alloy for automotive applications on laminate substrates was established as successful completion of 1000 cycles without failure. The test results were that all chips completed 1750 cycles without failure, with the Alloy A specimens not suffering any failures until 3000 cycles were completed.

While our invention has been described in terms of a preferred embodiment, other forms could be adopted by one skilled in the art. Accordingly, the scope of our invention is to be limited only by the following claims.

What is claimed is:

1. A lead-free tin-base solder alloy consisting of, in weight percent, about 7 to about 11% indium, about 2.5 to about 3.5% silver, and about 0.5 to about 1.5% copper, the balance tin and incidental impurities, the solder alloy having solidus and liquidus temperatures of less than 200° C. and a reflow temperature of less than 240° C.

2. A solder alloy as recited in claim 1, wherein the solder alloy has a solidus temperature of about 189° C. and a liquidus temperature of about 197° C.

3. A solder alloy as recited in claim 1, wherein the solder alloy is in the form of a solder bump on a surface-mount integrated circuit device.

4. A solder alloy as recited in claim 1, wherein the solder alloy is in the form of a solder joint attaching a component to a laminate substrate.

5. A solder alloy as recited in claim 1 wherein the solder alloy consists of in weight percent, about 7 to about 11% indium, about 3.0 to about 3.5% silver, and about 0.9 to about 1.1% copper, the balance tin and incidental impurities.

6. A solder alloy as recited in claim 1, wherein the solder alloy consists of in weight percent, about 10% indium, about 3.2% silver, and about 1.0% copper, the balance tin and incidental impurities.

7. A lead-free tin-base solder alloy consisting of, in weight percent, 84 to 90% tin, 7 to 11% indium, 2.5 to 3.5% silver, and 0.5 to 1.5% copper, the solder alloy having a solidus temperature of about: 189° C. and a liquidus temperature of about 197° C.

8. A solder alloy as recited in claim 7, wherein the solder alloy is in the form of a solder bump on a surface-mount integrated circuit device.

9. A solder alloy as recited in claim 7, wherein the solder alloy is in the form of a solder joint attaching a component to a laminate substrate.

10. A solder alloy as recited in claim 7, wherein the solder alloy consists of, in weight percent, 84 to 90% tin, 7 to 11% indium, 3.0 to 3.5% silver, and 0.9 to 1.1% copper.

11. A solder alloy as recited in claim 7, wherein the solder alloy consists of in weight percent, about 10% indium, about 3.2% silver, and about 1.0% copper, the balance tin.

* * * * *